(12) United States Patent
Liu et al.

(10) Patent No.: US 9,026,978 B1
(45) Date of Patent: May 5, 2015

(54) REVERSE INTERFACE LOGIC MODEL FOR OPTIMIZING PHYSICAL HIERARCHY UNDER FULL CHIP CONSTRAINT

(71) Applicant: Cadence Design Systems, Inc., San Jose, CA (US)

(72) Inventors: Dongzi Liu, Fremont, CA (US); Yi Qian, Shanghai (CN); Wanshuan Liu, Shanghai (CN); Pinhong Chen, Saratoga, CA (US); WenHsing Tsai, San Jose, CA (US); Yanhui Wang, Shanghai (CN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/062,807

(22) Filed: Oct. 24, 2013

(51) Int. Cl.
*G06F 9/455* (2006.01)
*G06F 17/50* (2006.01)

(52) U.S. Cl.
CPC .................... *G06F 17/505* (2013.01)

(58) Field of Classification Search
CPC .................................................. G06F 17/505
USPC .................... 716/100–113, 132–134, 139
See application file for complete search history.

(56) References Cited

U.S. PATENT DOCUMENTS

| | | | |
|---|---|---|---|
| 6,496,972 B1 * | 12/2002 | Segal | 716/103 |
| 6,578,183 B2 | 6/2003 | Cheong et al. | |
| 6,615,395 B1 | 9/2003 | Hathaway et al. | |
| 6,704,697 B1 | 3/2004 | Berevoescu et al. | |
| 7,000,206 B2 | 2/2006 | Kidd et al. | |
| 7,039,887 B2 | 5/2006 | Khalil et al. | |
| 7,216,312 B2 | 5/2007 | Jain et al. | |
| 7,216,316 B1 | 5/2007 | Sutherland et al. | |
| 7,243,313 B1 | 7/2007 | Qin et al. | |
| 7,398,491 B2 | 7/2008 | Schaeffer et al. | |
| 7,606,692 B2 | 10/2009 | Spadari et al. | |
| 7,926,011 B1 | 4/2011 | Levitsky et al. | |
| 7,930,675 B2 | 4/2011 | Levitsky et al. | |
| 7,941,774 B2 | 5/2011 | Luan et al. | |
| 8,151,229 B1 | 4/2012 | Chang et al. | |
| 8,181,145 B2 * | 5/2012 | Rice et al. | 716/134 |
| 8,418,120 B2 * | 4/2013 | Lu | 716/132 |
| 2005/0216875 A1 | 9/2005 | Zhang et al. | |
| 2006/0112359 A1 | 5/2006 | Becer et al. | |
| 2006/0248485 A1 | 11/2006 | Foreman et al. | |
| 2007/0283305 A1 | 12/2007 | Reddy et al. | |
| 2009/0044159 A1 | 2/2009 | Vinitzky et al. | |

(Continued)

*Primary Examiner* — Nha Nguyen
(74) *Attorney, Agent, or Firm* — Kenyon & Kenyon LLP

(57) ABSTRACT

A system, method, and computer program product for automatically optimizing circuit designs. A graphical user interface based environment allows arbitrary selection of a circuit design region to be optimized based on physical layout, without regard for logical hierarchy. Embodiments analyze circuit paths crossing optimization region boundaries and replace externally connected circuitry with an interface logic model describing such circuitry from the optimization region boundary to a first register occurrence. A reduced netlist spans the regional circuitry and the modeled external circuitry. Embodiments optimize the reduced netlist under design constraints applicable to the full circuit design. Changes to the original circuit design made by the optimization are tangibly saved as engineering change orders. The optimization process may be applied to other regions, including via parallel execution by multiple processors. Conventional design bottlenecks may be bypassed for greatly improved quality of results and reduced turnaround time.

20 Claims, 9 Drawing Sheets

(56) References Cited

U.S. PATENT DOCUMENTS

| | | |
|---|---|---|
| 2009/0055787 A1 | 2/2009 | Oh et al. |
| 2009/0132982 A1 | 5/2009 | Kotecha et al. |
| 2010/0235799 A1* | 9/2010 | Rice et al. .......... 716/8 |
| 2011/0173584 A1 | 7/2011 | Chen et al. |
| 2012/0254818 A1* | 10/2012 | Liu et al. .......... 716/124 |
| 2013/0024828 A1* | 1/2013 | Lu .......... 716/103 |

* cited by examiner

US 9,026,978 B1

REVERSE INTERFACE LOGIC MODEL FOR OPTIMIZING PHYSICAL HIERARCHY UNDER FULL CHIP CONSTRAINT

FIELD OF THE INVENTION

This patent application relates to the field of circuit simulation, and more precisely to more easily optimizing the performance of large circuit designs.

BACKGROUND

The re-use of circuit design information has become an important trend in the integrated circuit design industry. Large modern integrated circuit designs are increasingly created by assembling a number of previously-designed circuit portions, in an effort to reduce design turnaround times. Schematic and layout information for such circuit portions may be exchanged or licensed as design intellectual property. The successfulness of this trend thus depends on the amount of new design effort required to optimize and verify the performance of a new integrated circuit.

Verification is an important step in the process of designing and creating an electronic product. Verification helps ensure that the electronic design will work for its intended purpose, and is usually performed at several stages of the electronic design process. Circuit designers and verification engineers use different methods and analysis tools to optimize circuit designs, including simulation. Simulation verifies a design by monitoring computed behaviors of the design with respect to test stimuli. Circuit performance measurements may be performed by a post-simulation engine that evaluates simulated circuit waveforms, to save time. A variety of commercially offered software programs are available for circuit simulation. A circuit description used by a simulator is generally referred to as a netlist.

Flattening the description of a large composite circuit design into a single netlist and then simulating the entire new circuit design often takes too much memory and CPU time to be practical. As a result, circuit designers instead typically perform separate simulations, verifications, and optimizations on individual circuit blocks. Each circuit block may be simultaneously analyzed via a separate processor, to reduce the overall duration of this divide-and-conquer process.

Such parallel processing first requires dividing or partitioning of the integrated circuit into separate circuit blocks. These blocks may or may not match or closely correspond to the previously-designed circuit portions used for initial circuit construction. While partitioning by logical hierarchy may seem to be a good initial approach, it may be complicated by the possibility that parts of different blocks may operate under different clock domains in the new design. Critical timing paths may also span multiple blocks. Some initial circuit designs thus simply may not have a good logical hierarchy that lends itself to good partitioning.

Further, circuit pin assignment, floorplanning, and initial routing may be required to generate reasonably useful partitions for analysis. Layout tools may move and intertwine initially distinct block boundaries together to some extent, to reduce overall chip area. The boundaries of a logical hierarchy may thus not be clearly relatable to the boundaries of a physical hierarchy. Numerous time-consuming difficulties in dividing the integrated circuit for parallel processing can seriously limit design throughput capacity.

After partitioning, circuit designers typically allocate a portion of an overall full-chip timing budget to particular partitions, to generate block-level timing constraints. Such a priori budgeting may be non-optimal and even arbitrary. Timing budget quality is important when performing block-level optimization however, as a significant amount of repetitive analysis may result as timing constraints and budgets are adjusted between various interacting partitions.

Further, if each partition is optimized to meet its own functional goals and budget constraints without considering the goals and constraints of other partitions, changes to a particular partition may adversely impact the top level circuit's overall performance. In other words, a number of local partition optimizations may not necessarily lead to a fast global optimization of the full circuit design. Convergence problems with the overall currently used integrated circuit optimization process are therefore not unusual.

Thus, a need exists for an improved approach to circuit design optimization that avoids the bottlenecks and problems of the current design approach. Accordingly, the inventors have developed a novel methodology to help circuit designers optimize their large modern circuit designs.

DETAILED DESCRIPTION

This patent application presents a new system, method, and computer program product for automatically optimizing circuit designs. A graphical user interface based environment allows arbitrary selection of a circuit design region to be optimized based on physical layout, without necessarily any regard for logical hierarchy. Embodiments may analyze circuit paths crossing optimization region boundaries and replace externally connected circuitry with a reverse interface logic model describing such circuitry from the region boundary to a first register occurrence. A reduced netlist may span the regional circuitry and the modeled external circuitry.

Embodiments may optimize the reduced netlist under design constraints applicable to the full circuit design. Changes to the original circuit design made by the optimization may be tangibly saved, e.g. as engineering change orders. The optimization process may be applied to other regions, including via parallel execution by multiple processors. Conventional design bottlenecks may be bypassed for greatly improved quality of results and reduced turnaround time.

Figure 1:
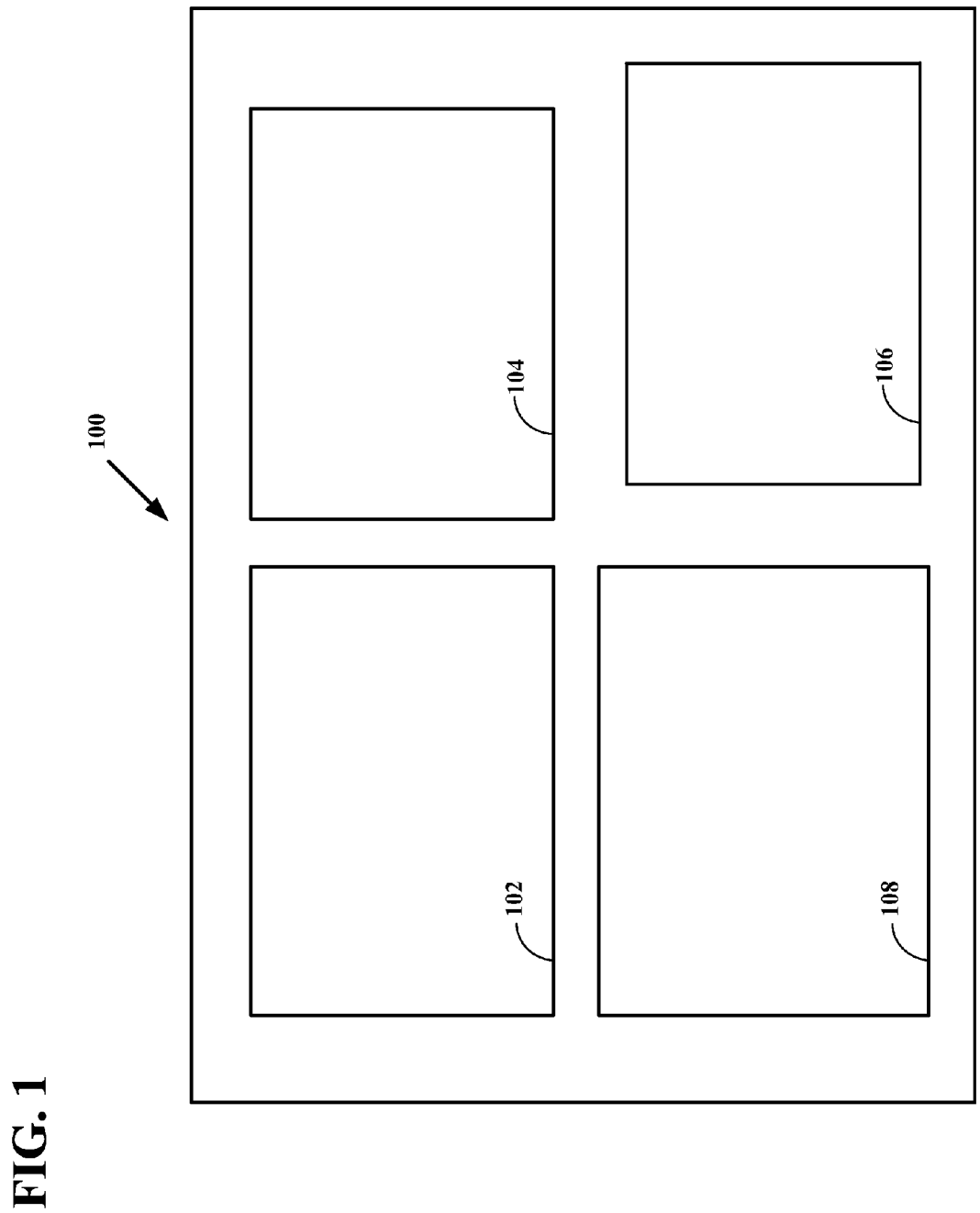
FIG. 1 is a diagram of an integrated circuit partitioned into optimization regions according to a logical hierarchy, according to an embodiment.

FIG. 1 shows an integrated circuit 100 partitioned into optimization regions according to a logical hierarchy, according to an embodiment. Four optimization regions are shown, 102, 104, 106, and 108, with each including circuitry that in this embodiment is logically related. For example, each optimization region's circuitry may comprise a circuit portion that was previously designed and is now being used to assemble a new integrated circuit, as previously described. It is also possible that each optimization region is selected by a circuit designer, for example to include multiple previously designed circuit portions that share a common clock domain. Optimization regions may also be defined by a design tool that analyzes integrated circuit logic. Although the optimization regions are shown as rectangular, this is merely exemplary for simplicity; the boundaries of each region may be non-rectangular.

This strategy of partitioning an integrated circuit into specified optimization regions for processing by the new methodology may not be as advantageous as alternatives to be described, but it is compatible with existing design tools. The strategy may thus be useful as a familiar starting point for designers, or as a basis of comparison for performance tests. While the embodiments of the invention may use logical hierarchy based partitioning, the embodiments are not limited to this strategy.

Figure 2:
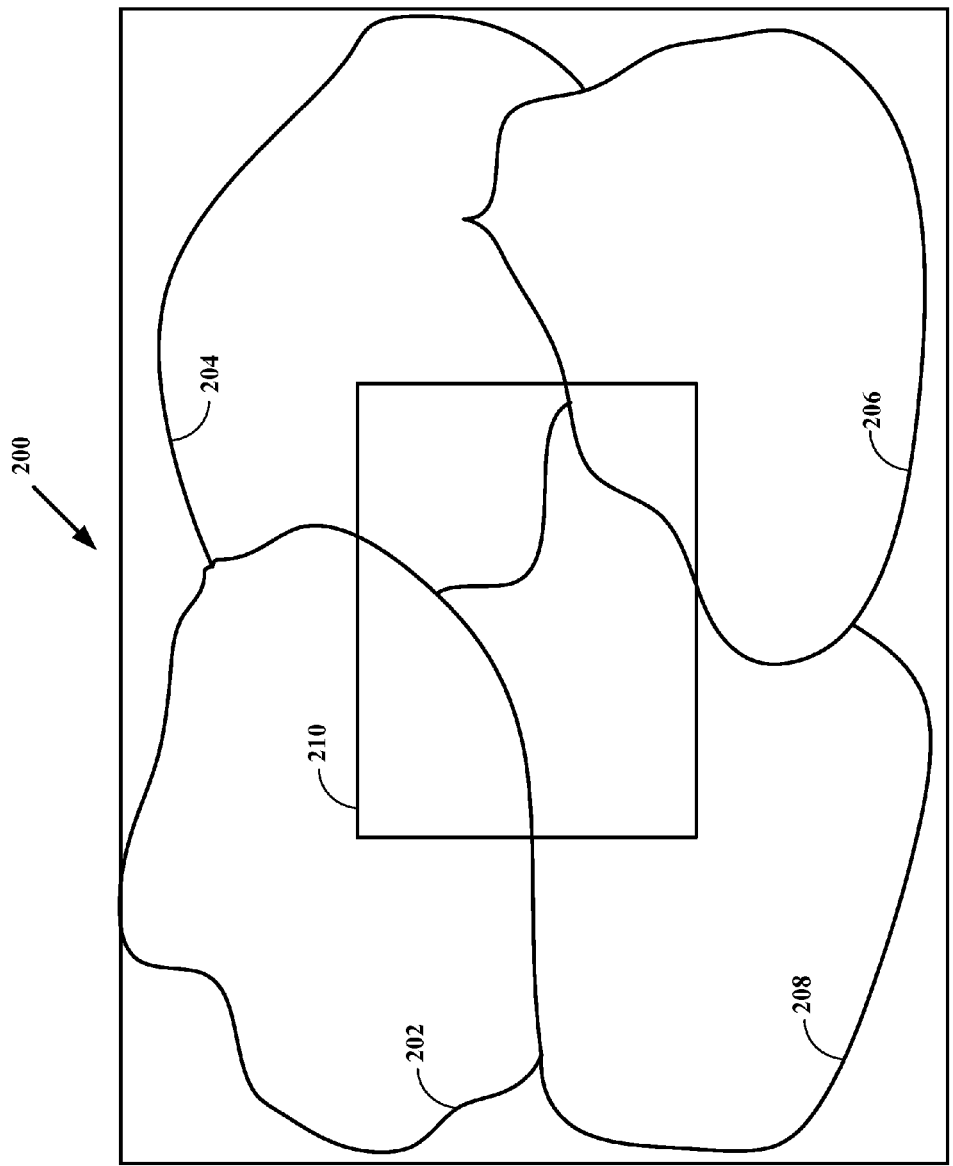
FIG. 2 is a diagram of an integrated circuit with an arbitrarily defined optimization region based on physical layout, according to an embodiment.

FIG. 2 shows integrated circuit 200 with an arbitrarily defined optimization region 210 based on physical layout, according to an embodiment. Unlike the previous example, in this embodiment integrated circuit 200 may include circuit portions 202, 204, 206, and 208 that need not be related via logical hierarchy. In this case, the circuit portions are shown as strongly non-rectangular, to denote that an initial placement may result in portions that are not necessarily separated, and may even be interpenetrating to some extent, to minimize circuit area.

Optimization region 210 may be one of a plurality of optimization regions to be processed according to the new methodology; only one is shown in this example for simplicity. Also, optimization region 210 is shown with rectangular boundaries specified for clarity, but the embodiments of the invention are not so limited. The shape of optimization region 210 may indeed be specified by a user or a design tool in a completely arbitrary manner, without regard to any logical hierarchy.

A circuit designer may for example select portions of an integrated circuit layout in a graphical user interface to define the boundaries of optimization region 210, and any other additional optimization regions desired. Optimization region 210 may be specified to cover circuitry that forms a critical timing path that may span multiple circuit portions, for example. Different sets of optimization regions 210 may be specified by different circuit designers.

The concept of an interface logic model is now summarized; a more detailed description is provided in references such as U.S. Pat. Nos. 7,039,887, 7,930,675, 7,941,774, and U.S. Patent Application Publication No. 2012/0254818, which are each incorporated herein by reference. The interface logic model has arisen from the availability and common use of previously designed circuit portions, which may be supplied as gate-level netlists, low level representations of logic designs, or as a higher abstraction level description such as a hardware description language. The general idea of an interface logic model is to minimize the amount of a design that must be analyzed and optimized using the most detailed circuit description, while still taking into account any significant effects of other portions of the circuit design.

For example, the suppliers of previously designed circuit portions typically test them, so some designers who use them may elect to perform a gate level simulation only on the circuitry they add outside the previously designed circuit portions. Such designers will therefore generally replace a gate level netlist of a previously designed circuit portion for example, that is computationally expensive to simulate, with a more abstracted equivalent circuit for faster simulation. For example, an interface logic model generator may produce an equivalent flattened Verilog netlist describing the previously designed circuit portion. Such a netlist may contain only the interface timing from the inputs to the first flip-flops and from the last flip-flops to the outputs, and clock information.

The interface logic model therefore contains only the logic related to timing paths that originate or terminate outside the previously designed circuit portion, in circuitry the designer is adding. Such paths may include register-to-register logic, and extend between clocked storage elements. Active reduction technologies may help identify such timing paths, and determine critical timing paths. Such circuit reduction may sharply reduce memory requirements. The designer may therefore focus only on quickly designing the circuitry used to connect particular timing paths to the previously designed and tested circuit portions.

In other words, an interface logic model is intended to simplify the modeling of what is inside a given circuit boundary. In contrast, a reverse interface logic model is similarly intended to simplify the modeling of what is outside a given circuit boundary. In this case, the circuit boundary is that of the optimization region 210. Thus, the reverse interface logic model of the embodiments describes the interface logic on circuit paths that cross and extend outside the boundaries of the optimization region 210, up until the first register encountered.

Figure 3:
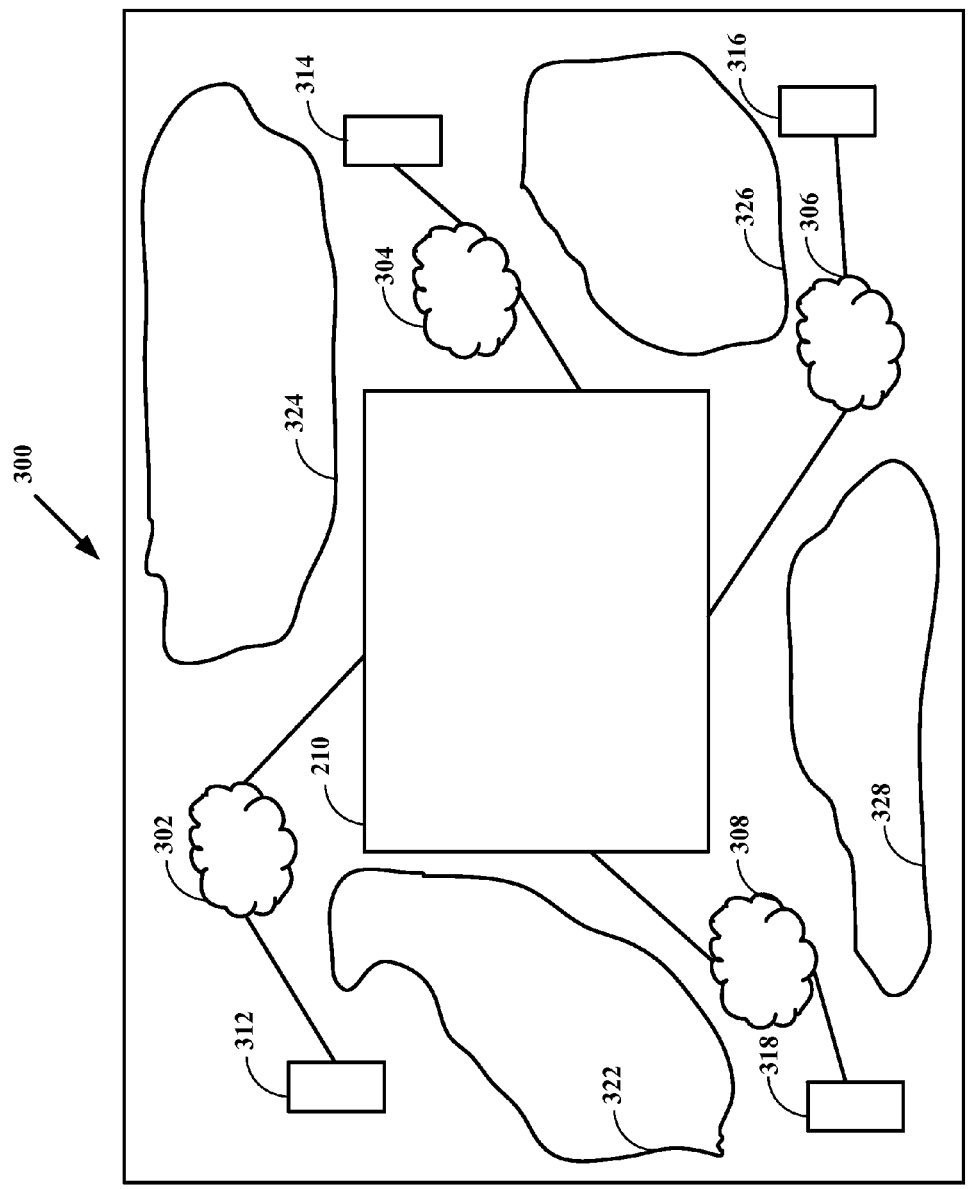
FIG. 3 is a diagram of the optimization region, and external circuitry to be represented by a reverse interface logic model, according to an embodiment.

FIG. 3 shows an integrated circuit 300 with the optimization region 210, and external circuitry represented by a reverse interface logic model, according to an embodiment. Optimization region 210 is again shown in singular rectangular form for simplicity, but the embodiments are not so limited. Circuit paths that are physically connected and proceed outward from optimization region 210 may be traced and replaced by equivalent circuitry, represented here by subcircuits 302, 304, 306, and 308. The circuit paths are traced until they terminate in clocked storage elements 312, 314, 316, and 318. The storage elements may comprise flip-flops and registers for example. Subcircuits 302-308 may comprise combinational logic elements for example. Additional circuitry external to optimization region 210 includes items 322, 324, 326, and 328; these items are not included in the equivalent circuitry previously described, because they have no electrical impact on the circuit paths proceeding outward from optimization region 210. Equivalent circuitry elements 302-318 therefore form the reverse interface logic model.

Figure 4:
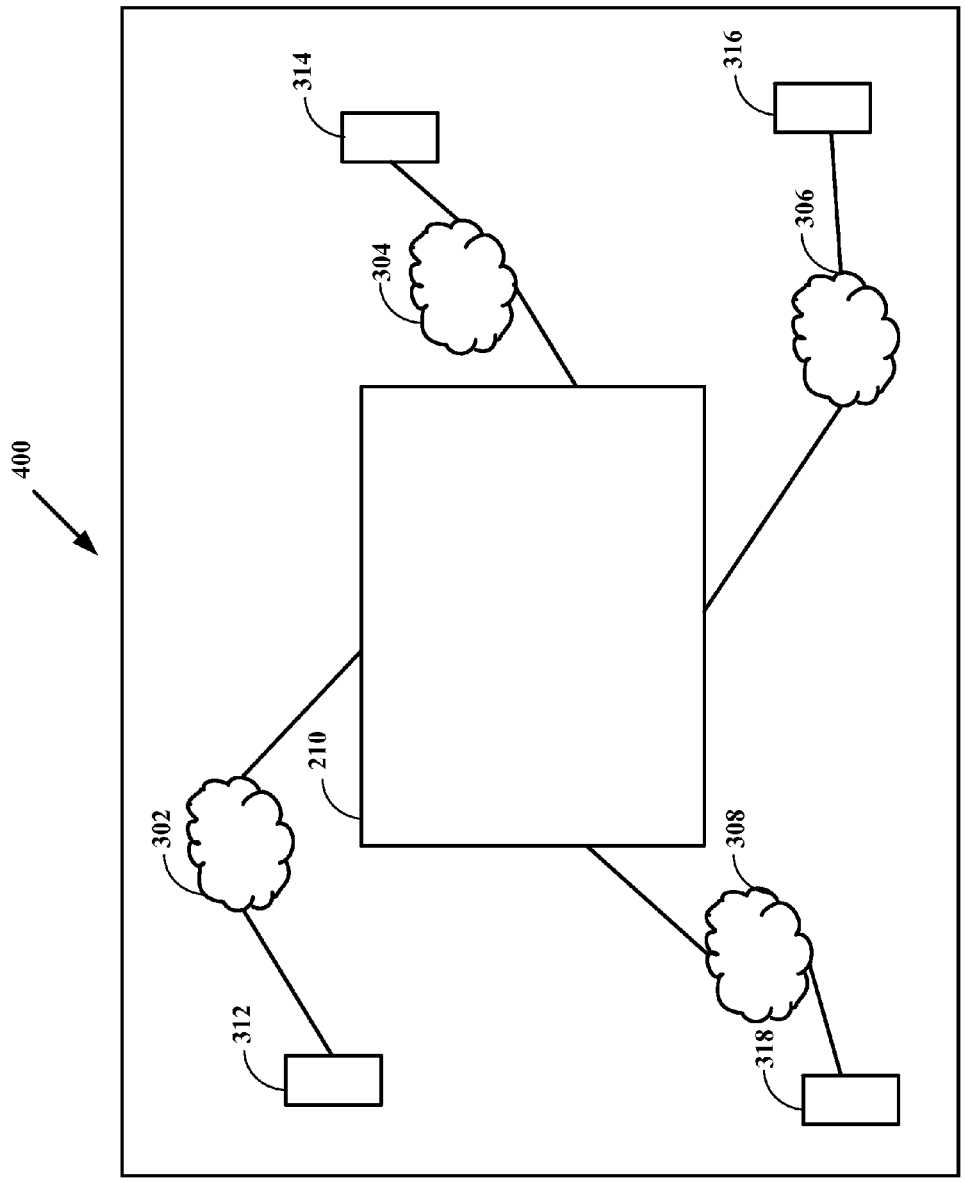
FIG. 4 is a diagram of the contents of a reduced netlist, comprising the optimization region and connected external circuitry modeled by a reverse interface logic model, according to an embodiment.

FIG. 4 shows the contents described by a reduced netlist, comprising the optimization region 210 and the connected external circuitry modeled by a reverse interface logic model, according to an embodiment. The reduced netlist is a simulator-readable description of the portions of the integrated circuit needed for proper simulation of optimization region 210; those portions are shown here as item 400. The reduced netlist is derived by creating the reverse interface logic model (e.g., elements 302-318) as described above, and simply omitting any subcircuits external to the optimization region 210 that are not required in the reverse interface logic model (e.g., elements 322-328).

The reduced netlist may then be simulated by running a circuit simulator using a computer. The performance of optimization region 210, including the influence of relevant connected circuitry described by the reverse interface logic model may be quantitatively evaluated. Circuit components in optimization region 210 may be adjusted to increase simulated performance measures. The results of the optimization may then be output, e.g. tangibly stored in a database, using means that are familiar to one of ordinary skill in the art. This described approach may sharply reduce the complexity and thus computational resources required by the simulator compared to a conventional simulation.

Further, unlike previous optimization efforts that focus on optimizing a particular circuit block in isolation, embodiments of the present invention perform adjustments to best meet the design constraints specified for the full circuit design. All of the circuit paths that are relevant to the optimization region 210 are incorporated into the reverse interface logic model and are therefore considered in the region's simulation. Embodiments thus avoid problems with convergence between potentially competing local optimizations on a number of particular circuit blocks. Far fewer iterations may thus be required for optimization of the full circuit design, because all the optimizations pursue the same full circuit design goals.

Accordingly, the embodiments eliminate the conventional need to perform an allocation of an integrated circuit's timing budget to different circuit blocks for separate optimizations. Such prior art allocations are often imprecise and even arbitrary. Embodiments of the present invention therefore also do not need to rebudget individual timing allocations to different circuit blocks to resolve optimization conflicts. The often slow, difficult, and frustrating process of estimating how to approximate a global optimization with a number of possibly counterproductive local optimizations is no longer necessary.

Figure 5:
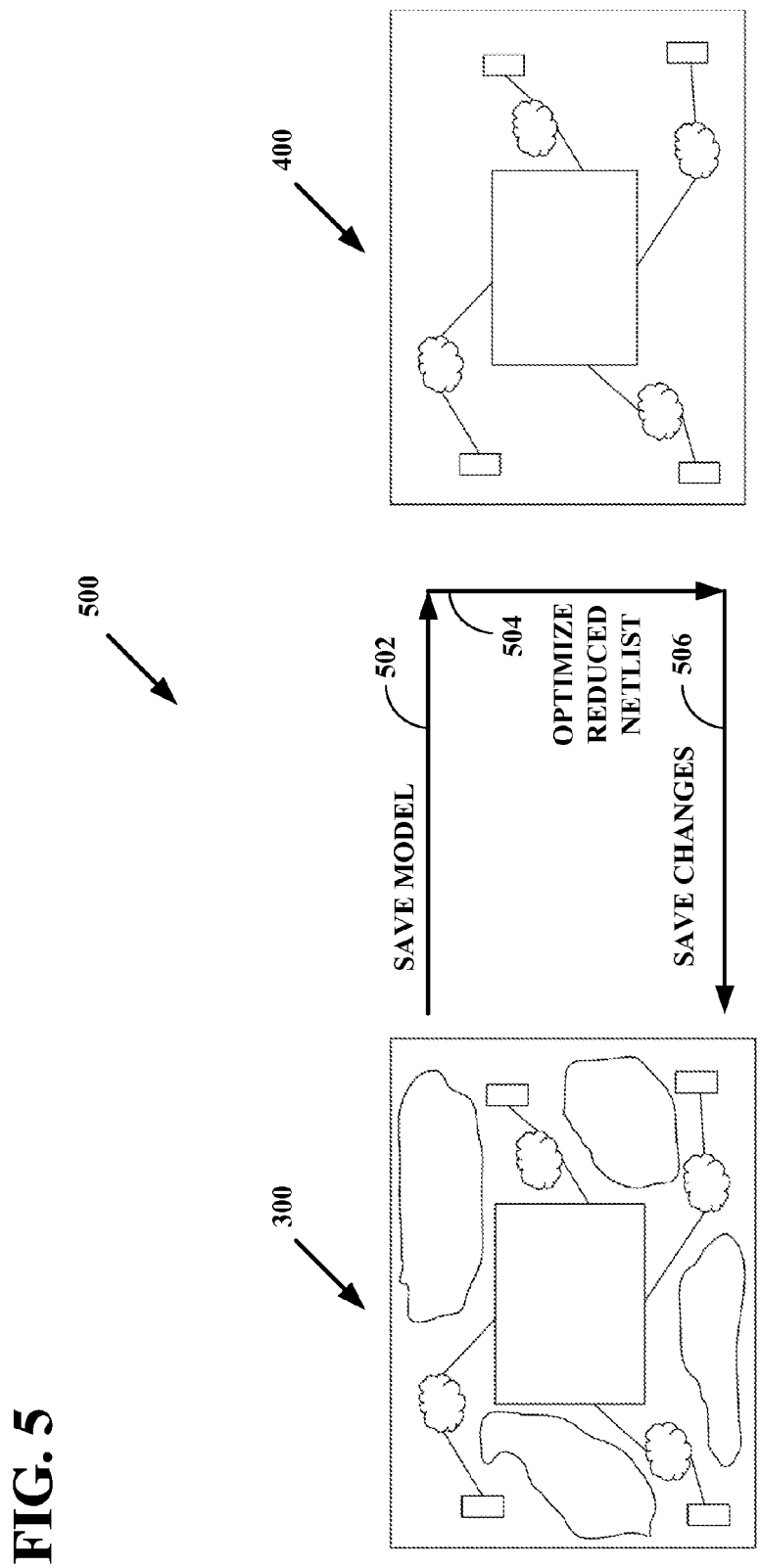
FIG. 5 is a diagram of a methodology for optimizing a reduced netlist and updating a design, according to an embodiment.

FIG. 5 depicts a methodology 500 for optimizing a reduced netlist 400 and updating a design, according to an embodiment. The full integrated circuit 200 is replaced with the equivalent integrated circuit 300 described above, including a specified optimization region and its relevant external circuitry modeled by a reverse interface logic model. In 502, the embodiments may save the model, e.g. written to a database, once it is derived. In 504, a simulator program may optimize the reduced netlist 400 by adjusting component values in the optimization region.

In 506, changes to the reduced netlist 400 may be saved, e.g. written to a database. In one embodiment, the changes to the reduced netlist 400 may be propagated back to update the equivalent integrated circuit 300 and the original circuit design by means of a number of engineering change orders. Engineering change orders are well-known for handling design modifications with minimal manual intervention. A variety of commercially offered software programs are available for engineering change order management.

Figure 6:
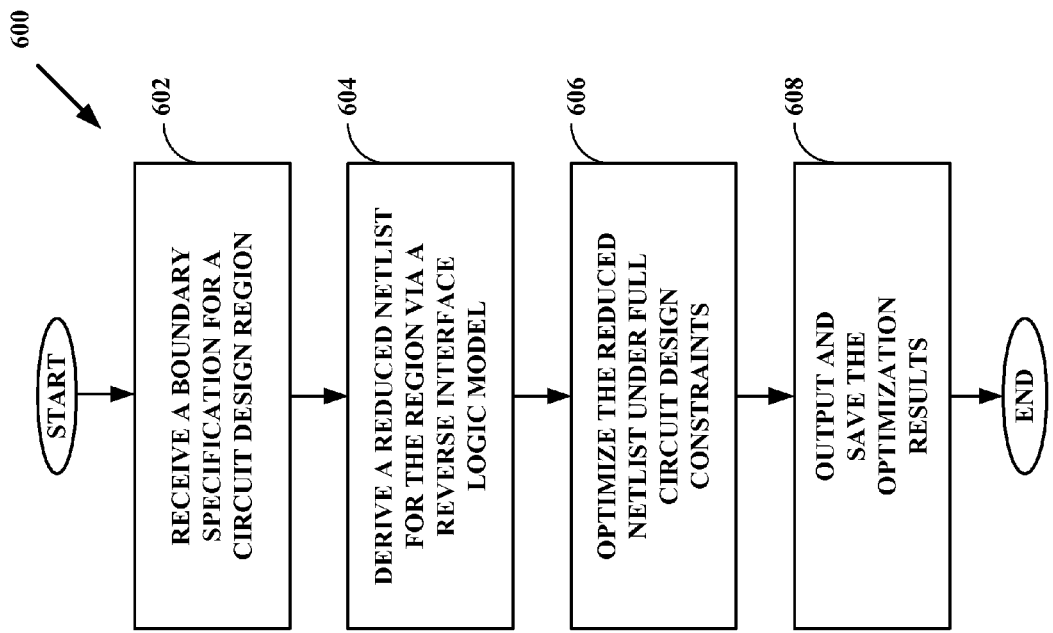
FIG. 6 is a flowchart for optimizing a reduced netlist and updating a design, according to an embodiment.

FIG. 6 is a flowchart 600 for optimizing a reduced netlist and updating a design, according to an embodiment. In 602, the embodiment may receive a boundary specification for a circuit design region. In 604, the embodiment may derive a reduced netlist for the region via a reverse interface logic model. In 606, the embodiment may optimize the reduced netlist under full circuit design constraints. In 608, the embodiment may output and save the optimization results, including adaptations to an original circuit design required to implement improved performance.

Figure 7:
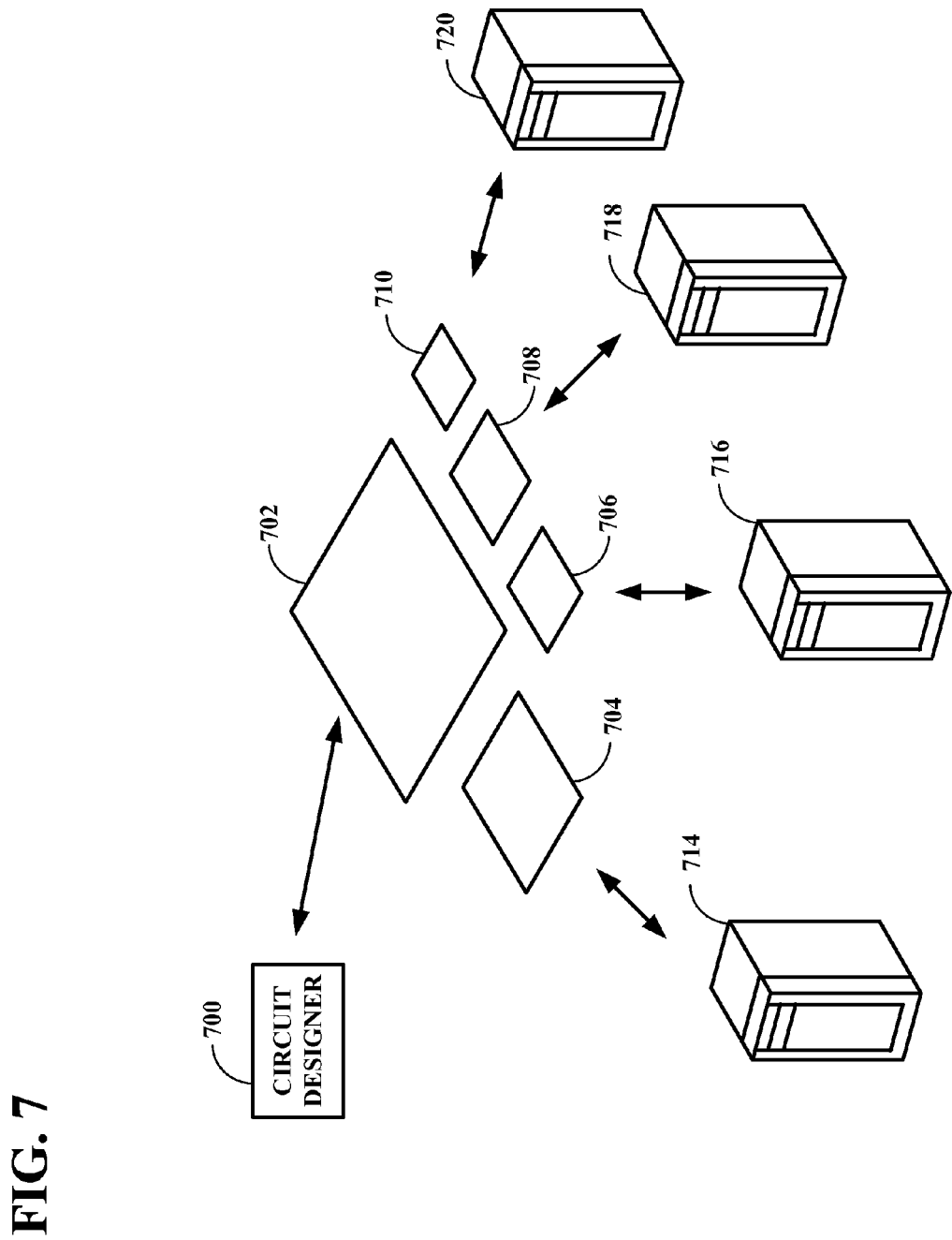
FIG. 7 is a diagram of parallel processing of several optimization regions, according to an embodiment.

Although the processing of a single optimization region has been described above for simplicity, a plurality of optimization regions may be processed. FIG. 7 depicts such parallel processing of several optimization regions, according to an embodiment. In this example, one or more circuit designers 700 work to design integrated circuit 702. Embodiments enable designers 700 to specify the boundaries of optimization regions, depicted here as items 704, 706, 708, and 710.

Each optimization region may then be processed by the methodology described above using one or more computing devices. Such computing devices may comprise separate processors in a multiprocessor system, as is known in the art. Separate computers, shown here as items 714, 716, 718, and 720 may also perform the optimizations, each using one or more processors. Any number of regions may be optimized by a given processor; a design tool may manage the distribution of optimization executions to the various computing resources available in a manner that maximizes productivity.

To summarize, the embodiments of the present invention may receive a boundary specification for a circuit design region, for example from a circuit designer or from a circuit design tool. The boundary specification may be defined completely arbitrarily, for example in terms of a circuit design physical layout. The boundary need not follow the extent of a logical hierarchy, although that may be an option in some embodiments. The boundary specification may encompass at least one critical timing path, which may extend across multiple blocks used to assemble a circuit design.

Embodiments may then derive a reduced netlist for faster processing. The reduced netlist may include the circuitry in the optimization region, but may also include circuitry outside the optimization region replaced by a less computationally-expensive model. In one embodiment, circuit paths crossing the boundary of the optimization region may have their extra-regional portions replaced by a reverse interface logic model. This model may describe the external circuitry from the boundary to the first encountered register. External circuitry that is not on a circuit path to the optimization region may be omitted.

Embodiments may then optimize the reduced netlist with a circuit simulator. The constraints for the full circuit design are applied, so that optimizations of each region's reduced netlist will proceed toward the same goals, and help avoid convergence failures. Finally, the results of the optimization are outputted to adjust the region's design. In one embodiment, the modified optimized circuit design region may be adapted into the original circuit design region using engineering change orders, a known mechanism for managing design modifications.

Any number of circuit design regions may be optimized according to the described methodology. In one embodiment, a plurality of processors may each process at least one circuit design region, to reduce overall processing time. Embodiments may sharply reduce the iterations required to perform optimizations, and the simulation time of each iteration may also be sharply reduced through use of the reverse interface logic modeling. Further, complete independence from timing budgeting is enabled, greatly reducing corresponding delays and convergence problems.

Figure 8:
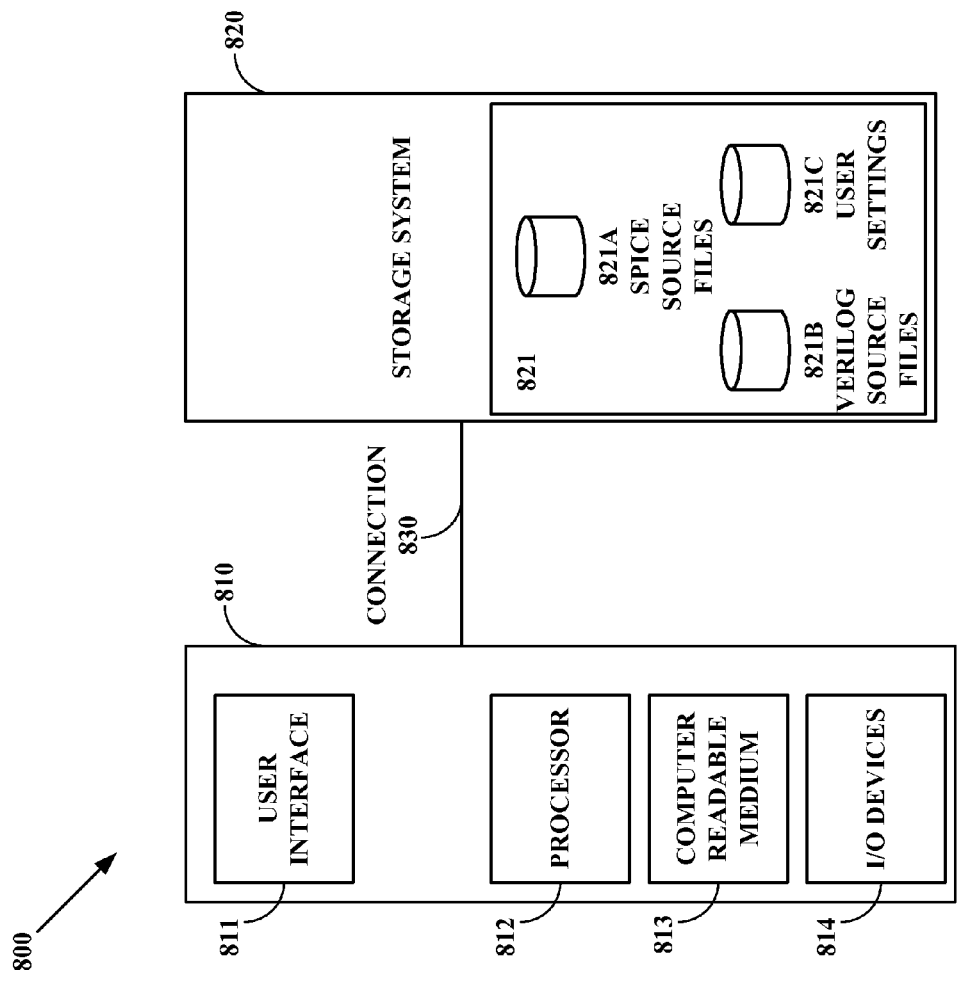
FIG. 8 is a block diagram of a circuit analysis system, according to an embodiment.

FIG. 8 shows a block diagram of an exemplary circuit analysis system 800, according to an embodiment. This system may provide simulator functionality for any of the methods described above. A user may access the system 800 through a standalone client system, client-server environment, or a network environment. System 800 may comprise one or more clients or servers 810, one or more storage systems 820, and a connection or connections 830 between and among these elements.

Client 810 may execute instructions stored on transitory or non-transitory computer readable medium 813 with processor 812, and may provide a user interface 811 to allow a user to access storage system 820. The instructions may be part of a software program or executable file that may operate electronic design automation (EDA) software. Client 810 may be any computing system, such as a personal computer, workstation, mobile computer, or other device employing a processor which is able to execute programming instructions. User interface 811 may be a GUI run in a user-controlled application window on a display. A user may interact with user interface 811 through one or more input/output (I/O) devices 814 such as a keyboard, a mouse, or a touch screen.

Storage system 820 may take any number of forms, including but not limited to a server with one or more storage devices attached to it, a storage area network, or one or a plurality of non-transitory computer readable media. Databases 821 may be stored in storage system 820 such that they may be persistent, retrieved, or edited by the user. Databases 821 may include SPICE source files 821A, Verilog source files 821B, and a user input database 821C for example. These databases may be kept as separate files or systems, or may be merged together in any appropriate combination.

Only one client 810 is shown connected to storage system 820 through connection 830, which may be a simple direct wired or wireless connection, a system bus, a network connection, or the like, to provide client 810 with access to storage system 820. In another aspect, connection 830 may enable multiple clients 810 to connect to storage system 820. The connection may be part of a local area network, a wide area network, or another type of network, again providing one or more clients with access to storage system 820. Depending on system administrator settings, client 810's access to system storage 820 or to other clients may be limited.

Figure 9:
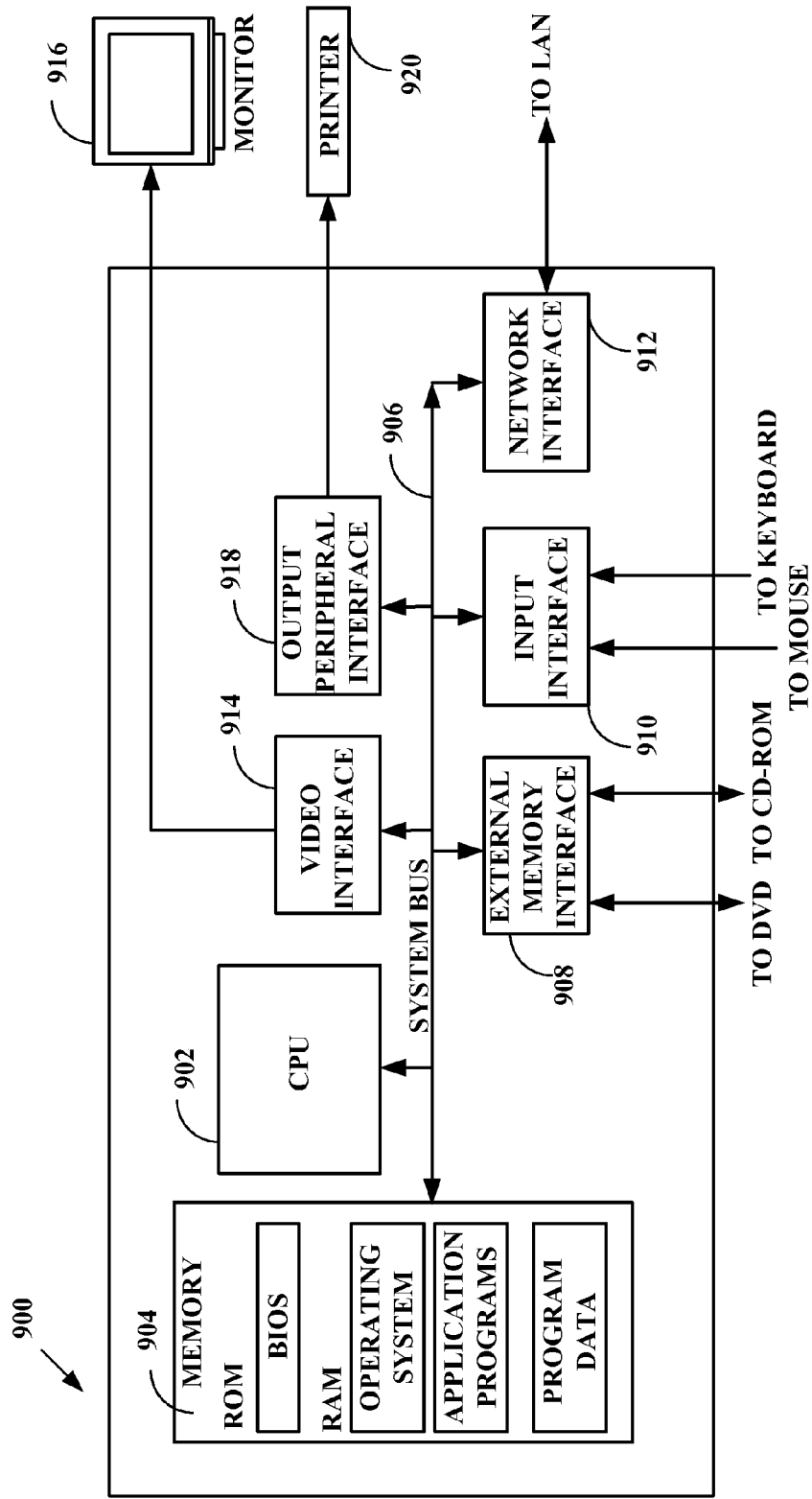
FIG. 9 is a diagram of a computer system, according to an embodiment.

FIG. 9 depicts an exemplary computer system comprising the structure for implementation of the embodiments described above. Computer system 900 comprises a central processing unit (CPU) 902 that processes data stored in memory 904 exchanged via system bus 906. Memory 904 typically includes read-only memory, such as a built-in operating system, and random-access memory, which may include an operating system, application programs, and program data. Computer system 900 also comprises an external memory interface 908 to exchange data with a DVD or CD-ROM for example. Further, input interface 910 may serve to receive input from user input devices including but not limited to a keyboard and a mouse. Network interface 912 may allow external data exchange with a local area network (LAN) or other network, including the internet. Computer system 900 also typically comprises a video interface 914 for displaying information to a user via a monitor 916. An output peripheral interface 918 may output computational results and other information to output devices including but not limited to a printer 920.

Computer system 900 may comprise for example a personal computer or an engineering workstation, each of which is widely known in the art and is commonly used for integrated circuit design tasks, along with software products commercially available for performing computer-aided integrated circuit design tasks. Computer system 900 may also comprise a mobile computer, including for example a tablet computer or a smart phone. The computer system of FIG. 9 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A computer-implemented method for more rapidly and reliably optimizing a circuit design, the method comprising:
   receiving a boundary specification for a circuit design region;

deriving a reduced netlist comprising circuitry within the circuit design region and all external circuitry that is outside the circuit design region but that is connected to circuit paths crossing the specified boundary, including all connected non-critical-path circuitry up to a first clocked respective storage element, with the external circuitry described by a reverse interface logic model;

using a computer, optimizing the reduced netlist with a circuit simulator tool under full circuit design constraints, wherein changes made to the reduced netlist are retained for coordinated optimizations of other circuit design regions; and outputting optimization results.

2. The method of claim 1 wherein at least one of a circuit designer and a circuit design tool provides the boundary specification.

3. The method of claim 1 wherein the boundary specification is defined in terms of one of a circuit design physical layout and a circuit design logical hierarchy.

4. The method of claim 1 wherein the boundary specification encompasses at least one critical timing path.

5. The method of claim 1 wherein, for a circuit design comprising a plurality of design regions, the method comprises, for each of the plurality of circuit design regions, performing the receiving of a respective boundary specification, deriving of a respective reduced netlist, optimizing of the reduced netlist, and outputting of the optimization results.

6. The method of claim 5 further comprising using a different processor for each of the plurality of circuit design regions.

7. The method of claim 1 wherein the outputting includes adapting an original circuit design region to an optimized circuit design region via at least one engineering change order.

8. A non-transitory computer readable medium storing instructions that, when executed by a processor, perform a method for more rapidly and reliably optimizing a circuit design comprising:

receiving a boundary specification for a circuit design region;

deriving a reduced netlist comprising circuitry within the circuit design region and all external circuitry that is outside the circuit design region but that is connected to circuit paths crossing the specified boundary, including all connected non-critical-path circuitry up to a first clocked respective storage element, with the external circuitry described by a reverse interface logic model;

optimizing the reduced netlist with a circuit simulator tool under full circuit design constraints, wherein changes made to the reduced netlist are retained for coordinated optimizations of other circuit design regions; and outputting optimization results.

9. The medium of claim 8 wherein at least one of a circuit designer and a circuit design tool provides the boundary specification.

10. The medium of claim 8 wherein the boundary specification is defined in terms of one of a circuit design physical layout and a circuit design logical hierarchy.

11. The medium of claim 8 wherein the boundary specification encompasses at least one critical timing path.

12. The medium of claim 8 wherein, for a circuit design comprising a plurality of design regions, the method comprises, using a different processor for each of the plurality of circuit design regions, performing the receiving of a respective boundary specification, deriving of a respective reduced netlist, optimizing of the reduced netlist, and outputting of the optimization results.

13. The medium of claim 8 wherein the outputting includes adapting an original circuit design region to an optimized circuit design region via at least one engineering change order.

14. A system for more rapidly and reliably optimizing a circuit design, comprising:

a memory storing executable instructions; and a processor executing instructions to:

receive a boundary specification for a circuit design region;

derive a reduced netlist comprising circuitry within the circuit design region and all external circuitry that is outside the circuit design region but that is connected to circuit paths crossing the specified boundary, including all connected non-critical-path circuitry up to a first clocked respective storage element, with the external circuitry described by a reverse interface logic model;

optimize the reduced netlist with a circuit simulator tool under full circuit design constraints, wherein changes made to the reduced netlist are retained for coordinated optimizations of other circuit design regions; and output optimization results.

15. The system of claim 14 wherein at least one of a circuit designer and a circuit design tool provides the boundary specification.

16. The system of claim 14 wherein the boundary specification is defined in terms of one of a circuit design physical layout and a circuit design logical hierarchy.

17. The system of claim 14 wherein the boundary specification encompasses at least one critical timing path.

18. The system of claim 14 wherein, for a circuit design comprising a plurality of design regions, the method comprises, for each of the plurality of circuit design regions, performing the receiving of a respective boundary specification, deriving of a respective reduced netlist, optimizing of the reduced netlist, and outputting of the optimization results.

19. The system of claim 18 further comprising using a different processor for each of the plurality of circuit design regions.

20. The system of claim 14 wherein the outputting includes adapting an original circuit design region to an optimized circuit design region via at least one engineering change order.

* * * * *